(12) United States Patent
Wang et al.

(10) Patent No.: US 6,723,674 B2
(45) Date of Patent: Apr. 20, 2004

(54) MULTI-COMPONENT CERAMIC COMPOSITIONS AND METHOD OF MANUFACTURE THEREOF

(75) Inventors: Donald M. Wang, Storrs, CT (US); You Wang, Gilbert, AZ (US); Tongsan D. Xiao, Willington, CT (US)

(73) Assignee: Inframat Corporation, Farmington, CT (US)

( * ) Notice: Subject to any disclaimer, the term of this patent is extended or adjusted under 35 U.S.C. 154(b) by 0 days.

(21) Appl. No.: 09/960,219

(22) Filed: Sep. 21, 2001

(65) Prior Publication Data

US 2003/0008764 A1 Jan. 9, 2003

(Under 37 CFR 1.47)

Related U.S. Application Data

(60) Provisional application No. 60/234,479, filed on Sep. 22, 2000.

(51) Int. Cl.[7] .................... C04B 35/106; C04B 35/10; C04B 35/117; C04B 35/119; C04B 35/12
(52) U.S. Cl. .................. 501/152; 501/103; 501/105; 501/132; 501/127; 501/153
(58) Field of Search ................ 501/152, 103, 501/105, 132, 127, 153

(56) References Cited

U.S. PATENT DOCUMENTS

| | | | | |
|---|---|---|---|---|
| 3,802,893 A | * | 4/1974 | Kiger et al. | 501/119 |
| 3,916,585 A | * | 11/1975 | Barks | 51/309 |
| 4,141,743 A | | 2/1979 | Grubba | 106/66 |
| 4,881,951 A | | 11/1989 | Monroe et al. | 51/309 |
| 5,059,095 A | | 10/1991 | Kushner et al. | 416/241 B |
| 5,114,891 A | * | 5/1992 | Kunz et al. | 501/127 |
| 5,498,269 A | * | 3/1996 | Larmie | 51/295 |
| 5,498,484 A | | 3/1996 | Duderstadt | 428/633 |
| 5,530,050 A | | 6/1996 | Rangaswamy | 524/430 |
| 5,651,801 A | | 7/1997 | Monroe et al. | 51/309 |
| 5,669,941 A | | 9/1997 | Peterson | 51/295 |
| 6,284,694 B1 | * | 9/2001 | Moeltgen et al. | 501/127 |

FOREIGN PATENT DOCUMENTS

| | | |
|---|---|---|
| JP | 61149740 A | 12/1984 |
| JP | 63274751 | 11/1988 |
| JP | 3215347 A | 1/1990 |
| JP | 5140505 | 6/1993 |
| JP | 05279832 | 10/1993 |
| JP | 2000095528 | 4/2000 |

OTHER PUBLICATIONS

Wang, You; Jiang, Stephen; Wang, Meidong; Wang, Shihe; Xiao,T. Danny; Strutt, Peter R.; Abrasive wear characteristics of plasma sprayed nanostructured alumina/titania coatings, www.elsevier.com/locate/wear, Wear 237 (2000) 176–185.

Abdel–Samad, A.A.; El–Bahloul,, A.M.M.; A comparative study on thermally sprayed alumina based ceramic coatings; Journal of Materials Science 35 (23000) 3127–3130.

(List continued on next page.)

*Primary Examiner*—C. Melissa Koslow
(74) *Attorney, Agent, or Firm*—Cantor Colburn LLP

(57) ABSTRACT

A microstructured or nanostructured multi-component ceramic comprises (a) a major ceramic phase comprising a ceramic oxide composite; (b) a ceramic oxide additive; and (c) a rare earth ceramic oxide additive, wherein the total of the additives (b) and (c) comprise from about 0.1 weight percent to less than 50 weight percent based on the total weight the multi-component ceramic composite. In another embodiment, a microstructured or nanostructured multi-component ceramic comprises (a) a major ceramic oxide phase comprising a ceramic oxide composite; and either (b) a ceramic oxide additive or (c) a rare earth ceramic oxide additive, wherein amount of the additive (b) or (c) comprises from about 0.1 weight percent to less than 50 weight percent based on the total weight the multi-component ceramic composite. Such ceramics are useful as bulk materials or as feedstocks for thermal spray.

24 Claims, 6 Drawing Sheets

OTHER PUBLICATIONS

Wang, You; Kovacevic, Radovan; Liu, Jiajun; Mechanism of surface modificatino of CeO2 in laser remelted alloy spray coatings; Wear 221 (1998) 47–53.

Kim, H.J.; Amorphous phase formation of the pseudo–binary Al2O3–Zro2 alloy during plasma spray processing, Journal of Materials Science 34 (1999) 29–33.

Lee, C.H.; Kim, H.K.; Choi, H.S.; Ahn, H.S.; Phase transformation and bond coat oxidation behavior of plasma–sprayed zirconia thermal barrier coating, Surface & Coating Technologies, Sep. 19, 1999.

Wang, Y.; Zhang, Q.; Su, M.; Zhong, Q.P.; The Influence of CeO2 on the Corrosion Resistance of Laster Remelted Alloy Spray Coatings on Steel; Scripts Metallurgica et Materialia, vol. 32, No. 6, pp. 891–894, 1995.

Tietz, et. Al; "Densifications Behaviour, Thermal Expansion and Chemical Properties of $ZrO_2$– and $CeO_2$– Based Solid Electrolytes for Solid Oxide Fuel Cells"; Forshungszentrum Julich GmbH, Institut fur Werkstoffe der Energietechinik (IWE), D–52425 Julich, Germany, no date.

RI, et. Al; "Synthesis and Characterization of $AL_2O_3/ZRO_2$, $AL_2O_3/TIO_2$, and $AL_2O_3/ZRO_2/TIO_2$ Fine Particles Prepared by Ultrasonic Spray Pyrolysis"; Mat. Res. Soc. Symp. Proc. vol. 520, no date.

Mantyla, et. Al; "Wear and Corrosion Resistance of Thermally sprayed Ceramic Oxide Coatings"; Protective Coatings and Thin Films, 421–430, no date.

Liberski, et. Al; "The Resistance of Thermally Sprayed Coatings to the corrosion Influence of Liquid Zine"; Silesian Technical University, Krasinskiego 8, 40–019 Katowice, Poland, no date.

Sharafat[a], et. Al; "Development of Composite Thermal Barrier Coatings With Anisotropic Microstucture"; Vacuum 59 (2000) 185–193.

Waudby, P.E.; "Rare Earth Additions to Steel"; International Metal Reviews, 1978 No. 2.

Wang, et. Al; "Effect of Rare Earth Elements on Microstructure and Wear Resistance of Laser Remelted Iron Alloy Coatings Containing Metalloids"; Surface Engineering 1993 vol. 9 No. 2 151–155.

Priem, et. Al; "Improvement of Plasma Sprayed Thermal Barriers by Laser Fusion"; in Adv. Sci. Technol. 9, 217–224 (1995), 7 29–34.

Mishra, et. Al; "Preperation of a $ZrO_2$–$Al_2O_3$ Nanocomposite by High–Pressure Sintering of Spray–Pyrolyzed Powders";J. Mater. Res., vol. 14, No. 3, Mar. 1999. pp. 835–839.

Wang, et. Al; "Influence of $CeO_2$ on the Microstructure and Wear Resistance of $M_{80}S_{20}$ Thermal Spray and Thermal Spray Welding Coatings"; Journal of Rare Earths, 1992 vol. 10 No. 3.

McNally[2], et. Al; "Processing and Hardness of Single Crystal $Al_2O_3$ Films Containing Nano–$ZrO_2$ Inclusions Produced by Chemical Solution Deposition[1]"; Phys. Stat. Sol. (A) 166, 231 (1998).

Katsuo, Saito; "Development of Superplastic Material by Surface Modification of Composite Ceramic Particles"; Kenkyu Gaiyo Hokokusho, Kokusai Koryu Hokokusho (Amada Kinzoku Kako Kikai Gijutsu Shinko Zaidan) (1995), 7, abstract only.

* cited by examiner

A. Metco 130 ($Al_2O_3/13TiO_2$)
B. n-$Al_2O_3/13TiO_2$
C. n-$Al_2O_3/13TiO_2$ + $CeO_2$
D. n-$Al_2O_3/13TiO_2$ +$CeO_2$+7YSZ

MULTI-COMPONENT CERAMIC COMPOSITIONS AND METHOD OF MANUFACTURE THEREOF

CROSS REFERENCE TO RELATED APPLICATIONS

This application claims the benefits of U.S. Provisional Patent Application Ser. No. 60/234,479, filed Sep. 22, 2000, which is fully incorporated herein by reference.

STATEMENT REGARDING FEDERALLY SPONSORED RESEARCH & DEVELOPMENT

The U.S. Government has certain rights in this invention pursuant to Office of Naval Research Grant No. N00014-97-1-0843.

BACKGROUND OF THE INVENTION

The present invention relates to ceramic materials, and in particular to multi-component ceramic composite materials.

Oxide ceramics such as alumina ($Al_2O_3$), zirconia ($ZrO_2$), titania ($TiO_2$), chromia ($Cr_2O_3$), silica ($SiO_2$), and yttria ($Y_2O_3$) have been widely used as coating materials to improve the surface properties of bulk materials. They are especially useful in applications where both wear and corrosion resistance is required. For example, alumina/titania ceramic coatings have excellent wear, erosion, fretting and cavitation resistance; heat resistance up to 540° C.; excellent resistance to most acids and alkalis; resistance to wetting by common aqueous solutions, and high dielectric strength. Because of the many advantageous properties of ceramic oxide coatings, particularly those prepared by thermal spray, they have found broad utility in a number of demanding technical applications, such as repairing steam valve stems, in land based gas turbines, diesel engines, cutting tools, medical implants, and catalytic converters.

A wide variety of multi-component ceramic oxides based on alumina as the major component have been reported, including a number suitable for use in thermal spray applications. For example, U.S. Pat. No. 4,141,743 discloses a composite powder suitable for use in thermal spray applications as a wear and/or corrosion resistant coating consisting of chromic oxide, magnesium oxide, iron oxide, titanium oxide, and aluminum oxide. U.S. Pat. No. 3,802,893 discloses a polycrystalline abrasion-resistant alumina composition having aluminum oxide, magnesium oxide, and samarium oxide. U.S. Pat. Nos. 4,881,951, 5,651,801 and 5,669,941 disclose abrasive grits formed of oxides of aluminum and rare earth metals. U.S. Pat. No. 5,498,269 discloses a ceramic abrasive comprising alumina, zirconia, and very small amounts of rare earth oxides. U.S. Pat. No. 5,059,095 discloses turbine rotor blade tips coated with alumina-zirconia ceramics.

Rare earth ceria has been used as an additive to alumina coatings formed by thermal spray processes, where it functions to refine the coating microstructure and decrease coating porosity. Ceria has also been used to aid the formation of fine net-shaped micro cracks in plasma sprayed alumina coatings, which could release the coating stress, resulting in an improved thermal shock resistance of the coating.

Zirconia or partially stabilized zirconia in thermal barrier coating systems is disclosed in U.S. Pat. Nos. 5,498,484 and 5,530,050. Zirconia powders containing ceria and yttria are disclosed in U.S. Pat. No. 5,530,050.

Additionally, ceria added to YSZ (yttria-stabilized zirconia) coatings can improve thermal cycling behavior. Ceria may also be added to stabilize zirconia for use as powder feedstock in plasma sprayed thermal barrier coatings. Ceria may also be added to a zirconia solution to prepare mixed oxides of ceria-zirconia, or to alumina-zirconia to produce processed powders for thermal spray applications.

Zirconia or YSZ has been used as an additive in certain metal ceramic thermal spray of nanostructured feedstocks. Such zirconia additives improve the material's thermal impact resistance, corrosion resistance, and moisture resistance.

Despite their many advantages, and there nonetheless remains a need in the art for improved ceramic materials, particularly materials having improved properties such as wear resistance. With respect to coatings, there remains a particular need for materials that demonstrate improved material toughness and strength, as well as improved bonding between the coating and the substrate coated.

SUMMARY OF THE INVENTION

The above-described drawbacks and disadvantages are alleviated by one embodiment of a microstructured or nanostructured multi-component ceramic, comprising (a) a major ceramic phase comprising a ceramic oxide composite; (b) a ceramic oxide additive; and (c) a rare earth ceramic oxide additive, wherein the total of the additives (b) and (c) comprise from about 0.1 wt % to less than 50 wt % based on the total weight of the multi-component ceramic composite. The ceramic oxide additive (b) and the rare earth ceramic oxide additive (c) may themselves comprise more than one ceramic oxide phase.

In another embodiment, a microstructured or nanostructured multi-component ceramic comprises (a) a major ceramic oxide phase comprising a ceramic oxide composite; and one of (b) a ceramic oxide additive or (c) a rare earth ceramic oxide additive, wherein the amount of the ceramic oxide additive (b) or rare earth ceramic oxide additive (c) comprise from about 0.1 weight percent to less than 50 weight percent based on the total weight the nanostructured multi-component ceramic composite.

A method for the manufacture of reconstituted, multi-component, ceramic composite powders comprises mixing and blending constituent powders, de-agglomerating the mixture of constituent powders, dispersing the de-agglomerated powders, optionally adding one or more binders to the dispersion of de-agglomerated powders, spray drying the dispersion to form reconstituted powders, and optionally heat treating the spray-dried powders.

The composites may be used as feedstocks for thermal spray of coatings, or for the manufacture of sintered, bulk ceramics. The above described and other features are exemplified by the following figures and detailed description

BRIEF DESCRIPTION OF THE DRAWINGS

Referring now to the figures wherein the like elements are numbered alike.

DETAILED DESCRIPTION OF THE INVENTION

Figure 1:
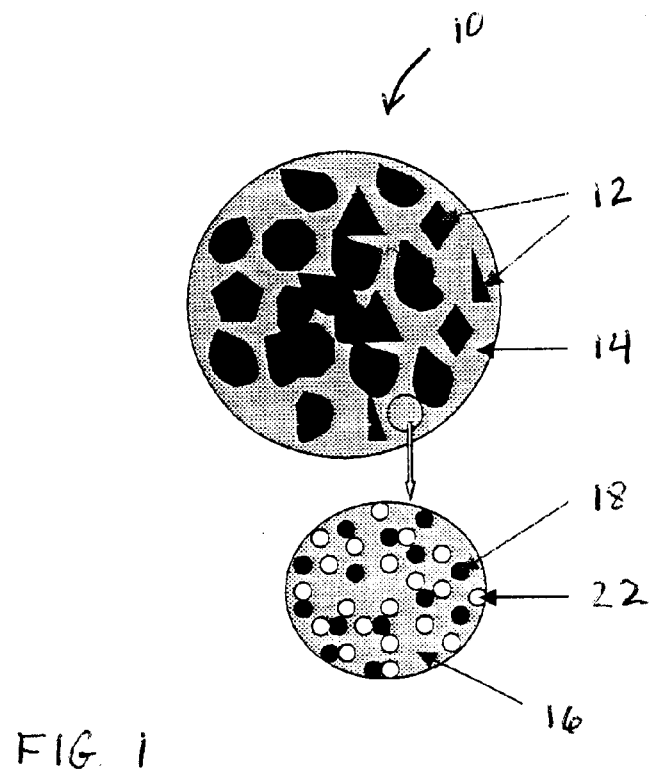
FIG. 1 is a schematic diagram showing one embodiment of a microstructured or nanostructured multi-component ceramic.

The inventive multi-component ceramic composites disclosed herein are useful as feedstocks for the manufacture of coatings by thermal spray, as well as components in bulk-sintered ceramics. The multi-component ceramic composites show improved density, impact strength, wear resistance, corrosion resistance, toughness, thermal shock resistance, and increased bond strength between coatings and matrices.

In a first embodiment, the multi-component ceramic composites may be nanostructured or microstructured. As used herein, "nanostructured" means that at least one of the components of the multi-component ceramic has grain sizes of less than 100 nanometers (nm). "Microstructured" as used herein means that all of the components of the multi-component ceramic have grain sizes of 100 nanometers or greater. This embodiment accordingly comprises (a) a major ceramic phase comprising a ceramic oxide composite; (b) a ceramic oxide additive; and (c) a rare earth ceramic oxide additive, wherein the total of the additives (b) and (c) comprise from about 0.1 weight percent to less than 50 weight percent based on the total weight the multi-component ceramic composite. The ceramic oxide additive (b) and the rare earth ceramic additive (c) may themselves comprise more than one ceramic oxide phase.

The major ceramic oxide phase (a) in this embodiment is itself a composite comprising at least two different oxides of metals such as aluminum, boron, calcium, magnesium, iron, zirconium, or a transition metal such as chromium, nickel, niobium, titanium, or the like. A composite of alumina and titania or chromia and titania is preferred.

The ceramic oxide additive (b) is different from the oxides of the major ceramic oxide composite, and comprises metal such as aluminum, boron, calcium, magnesium, iron, zirconium, or a transition metal such as chromium, nickel, niobium, titanium, or the like. The ceramic oxide additive (b) may itself be a composite ceramic. Zirconium, particularly cerium- or yttrium-stabilized zirconium is preferred. When a rare earth is present in this phase, it is considered part of the ceramic oxide additive (b) and not the rare earth ceramic oxide (c).

The rare earth ceramic oxide additive (c) comprises an oxide of a rare earth element. As used herein, a "rare earth element" is inclusive of scandium and yttrium, as well as the lanthanides, for example lanthanum, cerium, praseodymium, neodymium, samarium, terbium, and ytterbium. The rare earth ceramic oxide may be a composite.

Together, the ceramic oxide additive (b) and the rare earth ceramic oxide additive (c) comprise greater than or equal to about 0.1, preferably about 10, and more preferably about 20 wt % of the total multi-component ceramic composition. The combination of the ceramic oxide additive (b) and the rare earth ceramic oxide (c) furthermore comprises less than or equal to about 50, preferably about 40, and more preferably about 30 wt % of the total multi-component ceramic composition. The individual amounts of the optional, second metal ceramic and the rare earth metal ceramic may vary widely within these ranges, depending on the nature of the ceramics, and the desired properties of the multi-component ceramic. In general, the ceramic oxide additive (b) comprises 0 to about 40, preferably to about 30, and most preferably to about 20 wt % of the total multi-component ceramic composition. In general, the rare earth ceramic oxide additive comprises about 0.1 to about 30, preferably to about 20, more preferably to about 10 wt % of the total multi-component ceramic composition.

As mentioned above, the multi-component ceramic composites may be nanostructured, which as used herein means that at least one of the components has grain sizes of less than 100 nm. For example, one or more of the components may form a matrix having microstructured or nanostructured particulate inclusions of another of the components. By way of example, and not to be limited by the example, an exemplary form of this type of multi-component ceramic composite 10 is shown in FIG. 1, wherein the major ceramic phase comprises a dispersion 12 (e.g., alumina) within a matrix 14. Matrix 14 comprises a second component of the major ceramic phase 16 (e.g., titania), as well as a dispersion of a nanostructured ceramic oxide additive 18 (e.g., zirconia) and a dispersion of a nanostructured rare earth ceramic oxide additive 22 (e.g., ceria). Preferably, nanostructured, disperse phase particles of the rare earth ceramic oxide additive are distributed at grain boundaries and in grains. In these forms, the grain boundaries are more like grain boundary bands, and have very strong intercrystalline bond strength. Such grain boundary bands could form micron-, submicron-, or nanometer-sized skeletal microstructures in a whole splat.

Figure 2:
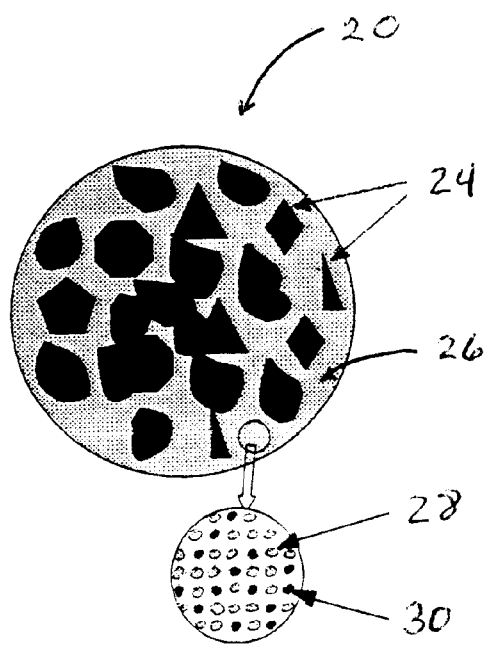
FIG. 2 is a schematic diagram illustrating the arrangement of a multi-component particle.

In another embodiment, a microstructured or nanostructured multi-component ceramic comprises (a) a major ceramic oxide phase comprising a ceramic oxide composite; and one of (b) a ceramic oxide additive or (c) a rare earth ceramic oxide additive, wherein the amount of the ceramic oxide additive (b) or a rare earth ceramic oxide additive (c) comprise from about 0.1 weight percent to less than 50 weight percent based on the total weight the nanostructured multi-component ceramic composite. An exemplary form of this embodiment is shown at FIG. 2, wherein multi-component ceramic 20 comprises a first major ceramic oxide phase component 24 (e.g., alumina) dispersed in a matrix 26 comprising a second major phase component 28 (e.g., titania) and additive 30 which is either a ceramic oxide additive (e.g., zirconia or yttria-stabilized zirconia) or rare earth ceramic oxide additive (e.g., yttria or ceria). Either yttria-stabilized zirconia or ceria is the preferred additive. Preferably, this multi-component ceramic is nanostructured, even more preferably, all components of the ceramic are nanostructured.

The weight of the additive in this embodiment comprises greater than or equal to about 0.1, preferably about 0.5, and more preferably about 1 wt % of the total multi-component ceramic composition. The weight of the additive in this embodiment further comprises less than or equal to about 50, preferably about 30, preferably about 20, more preferably about 10 wt % of the total multi-component ceramic composition.

The multi-component ceramics are conveniently provided and used in powder form, and may be manufactured by a variety of methods known in the art, preferably from individual powders of the constituent components. The powder forms of the multi-component ceramics are conveniently referred to as "the reconstituted composite powders", in order to distinguish them from the constituent powders used to make the composites. As described in greater detail below, one convenient and economical method for the formation of reconstituted composite powders comprises mixing and blending the constituent powders, de-agglomerating the mixture of constituent powders, dispersing the de-agglomerated powders and optionally adding one or more binders, spray drying the dispersion, and heat treating the spray-dried powders.

In general, powders of the requisite starting materials are mechanically mixed. If one or more of the powders is loosely agglomerated nanostructured particles, mixing the powder in a solvent followed by evaporation of the solvent will convert the powder mixture into a cake form, which will decrease powder dust during de-agglomeration and aid in controlling morphology of other processing steps.

Next, the mixed and blended powder is de-agglomerated. The de-agglomeration step serves two purposes, namely (1) de-agglomeration, and (2) achievement of high powder homogeneity. De-agglomeration may be accomplished by a mechanical milling process, for example high-energy ball milling. Important parameters during ball milling include the ball milling energy, ball milling time, and loading ratio of balls:powder:lubricant.

Composite powder dispersoids are then prepared in the form of either an aqueous solution using de-ionized water as the solvent or organic solutions, depending on the desired characteristics of the final agglomerated powder. Suitable organic solvents include, but are not limited to, toluene, kerosene, methanol, ethanol, isopropyl alcohol, acetone, and the like. Dispersants such as surfactants may be added to the solutions to assess their potential benefit for achieving optimal homogeneity of the dispersed composite. Important parameters here include solid: solvent loading, and the rheological behavior of the slurry.

In the formation of nanostructured or wholly nanostructured multi-composite ceramics, a binder may be added to each powder dispersoid prior to spray drying. In organic liquid mediums, the binder comprises from about 5% to about 15% by weight, and preferably about 10% by weight of paraffin dissolved in a suitable organic solvent. Suitable organic solvents include, but are not limited to, hexane, pentane, toluene and the like. In aqueous liquid mediums, the binder comprises an emulsion of commercially available polyvinyl alcohol (PVA) polyvinylpyrrolidone (PVP), carboxymethyl cellulose (CMC), or some other water soluble polymer, formed in deionized water. The binder is present in the range from about 0.5% to about 5% by weight of the total solution, and preferably from about 1% to about 10% by weight of the total solution. Solutions can be prepared for a range of binder compound concentrations.

After powder mixing, deagglomeration, and dispersion, the suspension may be reconstituted by means known in the art such as spray drying. While any suitable non-reactive gas or mixture thereof may be used, hot nitrogen or hot argon is preferred. Because there is no requirement for the treatment of exhaust gases from the spray drier using aqueous liquid mediums, these are preferred where possible. Important parameters in the reconstitution process include slurry concentration, slurry delivery rate, drying temperature, and atomization speed.

The reconstituted powder may then be heat treated to produce composite material with optimal flow characteristics, physical stability, and optimal morphology. Heat treatment parameters include degree of binder burn-out, nanoparticle sintering characteristics and thermal changes of reconstituted powder, particles in the plasma, porosity, morphology, size and density of reconstituted powder particles following heat treatment, tapping density and flowability.

One preferred multi-component ceramic comprises nanostructured alumina/titania as the major ceramic phase, yttria-stabilized zirconia as the ceramic oxide additive, and ceria as the rare earth ceramic additive.

Another preferred multi-component ceramic comprises microstructured alumina/titania as the major ceramic phase, yttria-stabilized zirconia as the ceramic oxide additive, and ceria as the rare earth ceramic additive.

Another preferred multi-component ceramic comprises microstructured chromia/titania as the major ceramic phase, yttria-stabilized zirconia as the ceramic oxide additive, and ceria as the rare earth ceramic additive.

One preferred multi-component ceramic comprises nanostructured alumina/titania as the major ceramic phase, and ceria as the rare earth ceramic additive.

Another preferred multi-component ceramic comprises microstructured alumina/titania as the major ceramic phase, and ceria as the rare earth ceramic additive.

Another preferred multi-component ceramic comprises microstructured alumina/titania as the major ceramic phase, and yttria-stabilized zirconia as the ceramic oxide additive containing a rare earth.

Another preferred multi-component ceramic comprises microstructured chromia/titania as the major ceramic phase, and ceria as the rare earth ceramic additive.

The multi-component composites have a variety of uses. In particular, they may be used in the form of reconstituted powders for manufacturing bulk, sintered ceramics. Nanostructured or wholly nanostructured composites are particularly useful in the bulk sintered process as it is possible to sinter nanostructured ceramics at temperatures that are substantially lower than those required for coarse-grained ceramics, due to their fine microstructures, small diffusion scales, and high grain boundary purity. Also, nanostructured ceramics are reported to exhibit unusually high ductility.

Alternatively, the multi-component ceramic composites in reconstituted powder form may be used as feedstocks for thermal spray. Thermal spray is a technique by which molten or semi-molten particles are deposited onto a substrate, and the coating results from the solidification or bonding of the particulates. During the short residence time in the flame or plasma, the particles are rapidly heated to form a spray of partially or completely melted droplets. The large impact forces created as these particles arrive at the substrate surface promote strong particle-substrate adhesion and the formation of a dense coating of almost any desired material, with the coatings ranging in thickness from 25 microns to several millimeters, and formed at relatively high deposition rates.

In current industrial practice, the powders used to deposit ceramic coatings by thermal spray consist of particles in the range of from 5 to 150 microns in diameter. Because the reconstituted composite powders can be reconstituted to within this size range, they are particularly useful for thermal spray, and may be used in the manufacture of thermally sprayed coatings for wear, corrosion, and thermal protection.

The thermally sprayed coating will benefit many industries including the chemical, electronics, utility, textile, paper, printing, and glass industries. Applications include, but are not limited to, coatings on submarine and ship components, automobile and aircraft parts, printing rolls, paper drying rolls, textile machinery parts, hydraulic pistons, water and pumps, glass pressing mandrels, combustion engines, and gas turbines.

The invention is further exemplified by the following non-limiting examples.

EXAMPLES

Nanostructured alumina and titania powders obtained from Nanophase Technologies Corporation, Burr Ridge, Ill. Micron-sized alumina is obtained from Alcoa, and micron-sized titania powder is obtained from Dupont. Commercial chromia is obtained from LaPorte Pigment. Commercially available "Metco 130 coatings", used for comparison purposes, are conventional microstructured alumina/titania composites made using the plasma spray parameters set forth in the Sulzer Metco Product Bulletin.

Example 1

Addition of Ceria to Nanostructured Alumina/Titania

Nanostructured alumina (17.4 pounds, grain size about 30 nm) and 2.6 pounds of titania were blended and mixed to form a powder mixture that was then ball milled to obtain more homogeneous mixing and de-agglomeration of the powders. The ball milled, nanostructured alumina/titania mixture was then dispersed in water to form a viscous slurry, and a dispersant was added to attain a colloidal solution of the de-agglomerated powder. PVA was also added at this stage as a binder material. The slurry was then spray dried to form reconstituted alumina/titania spherical agglomerates, which were then heat treated from room temperature to 1200° C. After the reconstitution, the powder tapping density was about 1.4 to about 1.6 g/cm$^3$. Ceria (0.6 pounds) was then added to 10 pounds of the reconstituted alumina/titania powder by blending and mixing.

The above processed powders were then thermal sprayed into high quality coatings. Thermal spray of the reconstituted sprayable feedstocks was performed using a Metco 9MB plasma gun. Nanostructured coatings of thickness from 250 microns to 600 microns were deposited on C-steel and mild steel substrate coupons. These coupons were in a grit blasted condition prior to thermal spray deposition. Plasma spray parameters were: 100 psi (pounds per square inch) primary Ar pressure, 55 psi secondary H$_2$ pressure, 120 SCFH (standard cubic feet per hour) Ar flow rate, 40–70 SCFH powder carrier flow rate, about 3.0 lb/hr powder feed rate, 600 A plasma current, and 65 V plasma voltage.

Figure 3:
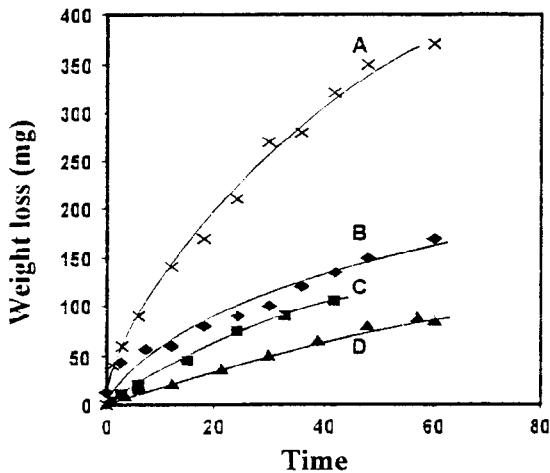
FIG. 3 is a line graph comparing the abrasive wear of microstructured and nanostructured alumina/titania multi-component ceramic composites.
Figure 4:
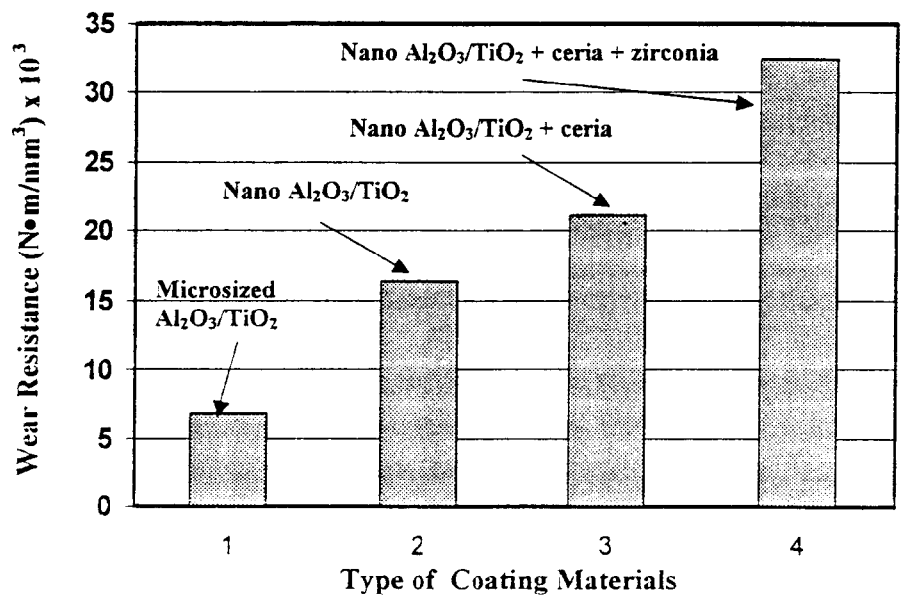
FIG. 4 is a bar graph comparing the abrasive wear of microstructured and nanostructured alumina/titania multi-component ceramic composites.

The abrasive wear resistance of the plasma sprayed nanostructured alumina/titania coating with a ceria additive is shown in FIG. 3. The abrasive wear resistance of pure nanostructured alumina/titania coating and commercial Metco 130 (micrometer sized alumina/13 titania) coatings are also plotted in FIG. 4 for comparison purposes. The wear resistance of pure nanostructured alumina/titania coating is about two times that of Metco 130, but the wear resistance of thermal sprayed alumina/titania coatings is remarkably increased by modification of the alumina/titania powder using a ceria additive. For example, the abrasive wear resistance increased three fold when 6 wt % ceria was added to the feedstock.

Example 2

Figure 5:
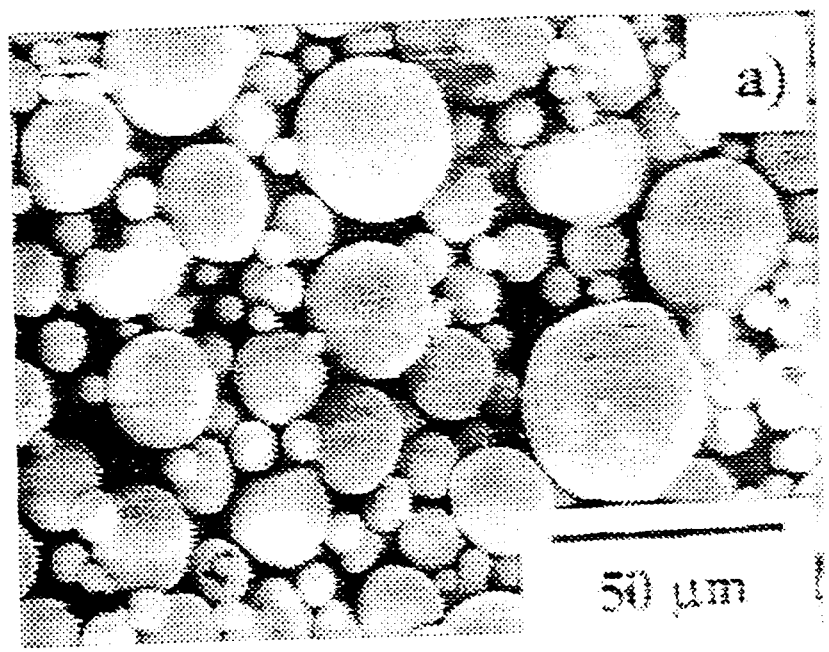
FIG. 5 is a scanning electron micrograph (SEM) image displaying both the surface (A) and cross-section morphology (B) of a nanostructured alumina/titania composite after reconstitution, heat treatment, and plasma densification.
Figure 5:
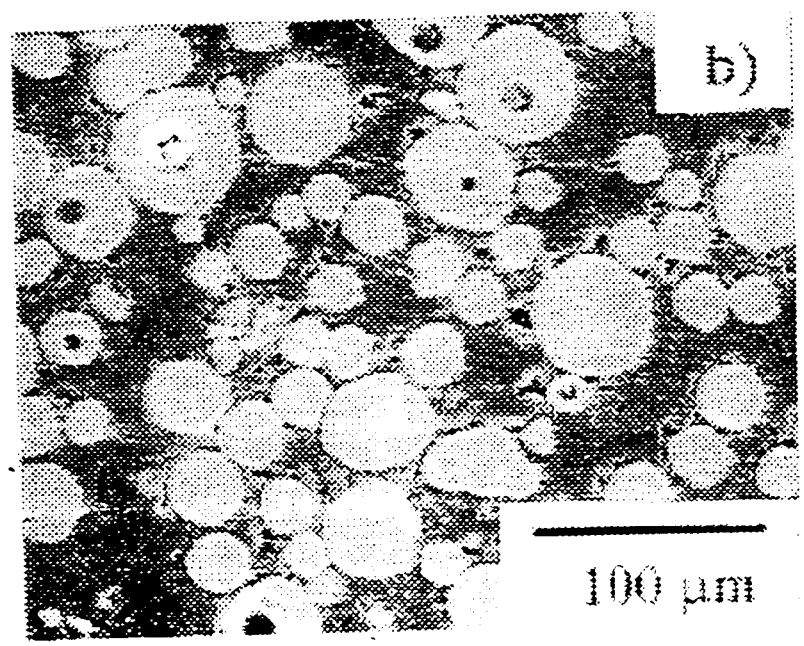

Addition of Ceria and Yttria-Stabilized Zirconia (YSZ) to Nanostructured Alumina/Titania A slurry of nanostructured alumina (7 kg, about 30 nm grain size) and 1.494 kg of titania, 0.69 kg of ceria, and 1.915 kg of YSZ ("7 wt % yttria" or "7YSZ") was prepared as described above, except that the ceria and 7YSZ were combined with the alumina and titania prior to the initial blending and mixing. The aqueous slurry containing a PVA binder was then spray dried to form reconstituted alumina/titania+ceria+7YSZ nanocomposite spherical agglomerates. The reconstituted alumina/titania+ceria+7YSZ nanocomposite mixture was then heat treated from room temperature to 1200° C. After the reconstitution, the tapping density of the powders is about 1.8 g/cm$^3$ ("grams/cubic centimeter").

Where high-density powders are required, a plasma densification technique has also been used. A Metco 9MB plasma system is used to process the powder, which rapidly heats the nanocomposite to its melting temperature, followed by rapid cooling, which shoots the powder into a water-cooled bucket. After cooling the powder become extremely dense, with a tapping density of about 2.0–2.4 g/cc ("grams/cubic centimeter"). Typical SEMs (scanning electron micrograph) of this nanocomposite in the conditions of (1) as-reconstituted, (2) heat treated, and (3) plasma densified are shown in FIGS. 5A (surface morphology) and 5B (cross-sectional view).

The above processed powders were then thermal sprayed into high quality coatings. Thermal spray of the reconstituted sprayable feedstocks was performed using a Metco 9MB plasma gun. In the thermal spray experiments, Taguchi designed experiments were use to optimize the thermal spray parameters. A typical experiment is shown in Table 1.

TABLE 1

| | $L_9(3^4)$ Taguchi Design for Plasma Spraying of dense Alumina/Titania Coatings | | | |
|---|---|---|---|---|
| Run Number | Ar Flow Rate (SCFH) | Current (Amp) | Powder Feed Rate (lb/hr) | Spray Distance (Inch) |
| 1 | 120 | 400 | 1.5 | 3.5 |
| 2 | 120 | 500 | 2.5 | 4.0 |
| 3 | 120 | 600 | 3.5 | 4.5 |
| 4 | 160 | 400 | 2.5 | 4.5 |
| 5 | 160 | 500 | 3.5 | 3.5 |
| 6 | 160 | 600 | 1.5 | 4.0 |
| 7 | 200 | 400 | 3.5 | 4.0 |
| 8 | 200 | 500 | 1.5 | 4.5 |
| 9 | 200 | 600 | 2.5 | 3.5 |

After analysis of the above results, the optimal thermal spray parameters were found to be 100 psi primary Ar pressure, 55 psi secondary H$_2$ pressure, 120 SCFH Ar flow rate, 40–70 SCFH powder carrier flow rate, about 3.0 lb/hr powder feed rate, 600 A (amps) plasma current, and 65 V (voltage) plasma voltage. The nanocomposite sprayable powders were also plasma sprayed using Metco specified parameters, using a 5 lb/hour powder spray rate. It was demonstrated that when high powder delivery rate was used in the coating process, the Metco specified parameters for thermal spray Metco 130 gives the best coating.

The abrasive wear resistance of the plasma sprayed nanostructured alumina/titania coating with ceria and 7YSZ additives is also plotted in FIG. 3. Here, the wear resistance of thermal sprayed alumina/titania coatings was remarkably increased (4 to 5 times) by modification of the alumina/ titania powder using both 6 wt % of ceria and 10 wt % of 7YSZ. Furthermore, the coating obtained using nanostructured alumina/titania+ceria+7YSZ additives have much improved bond strength. For example, typical Metco 130 has bond strength of 1,900 psi, while coatings obtained using nanostructured alumina/titania with ceria and 7YSZ additives have bond strengths ranging from 3,000 up to 8,000 psi.

Figure 6:
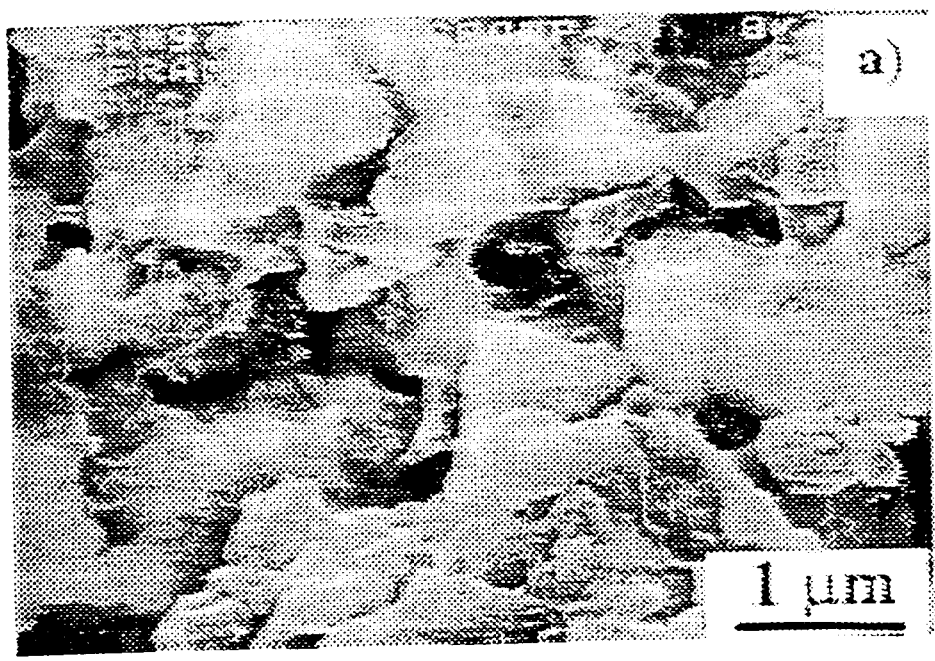
FIG. 6A is an SEM image depicting an alumina dispersion phase and a titania matrix phase wherein both alumina and titania are microstructured.
FIG. 6B is an SEM image depicting an alumina dispersion phase and a titania matrix phase wherein both alumina and titania are nanostructured.
Figure 6:
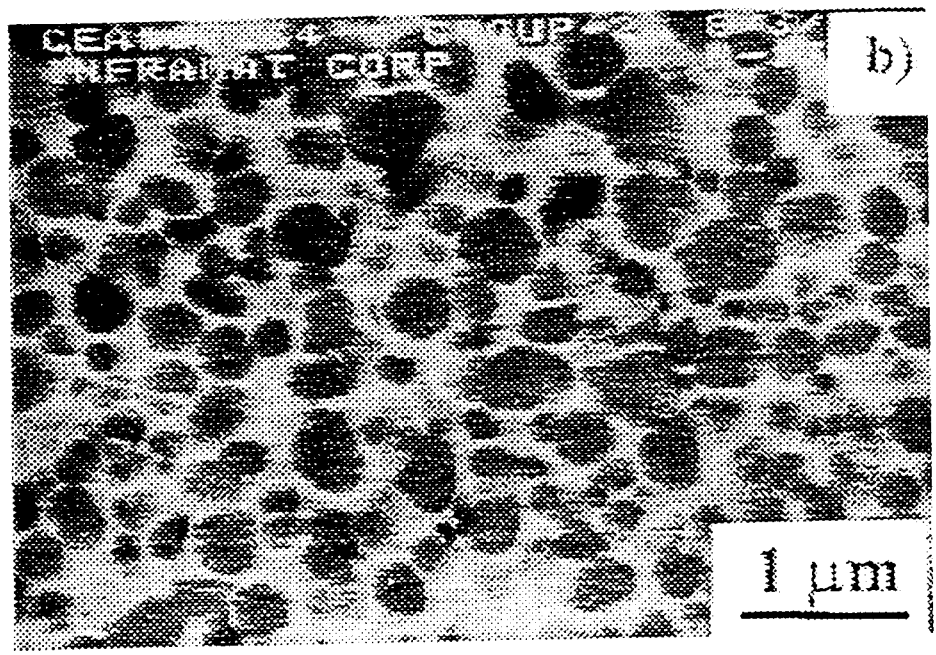

The coating microstructures of both Metco 130 and alumina/titania+ceria+7YSZ additives have been examined using field emission SEM. At low magnification, e.g., below 5,000×, both coatings are dense, with density in excess of 95%, and they revealed similar microstructure. Detailed SEM examination at high resolution revealed a significant difference between the Metco 130 and the alumina/titania coatings. As shown in FIG. 6A, the Metco 130 coating, although very dense, has a more fragile microstructure, or poor wetting between the titania matrix and alumina dispersion, resulting in poor sintering of the particles during plasma spray. On the other hand, the alumina/titania+ceria+ 7YSZ coating, shown in FIG. 6B, had good wetting between the titania matrix phase and alumina dispersion phase.

Figure 7:
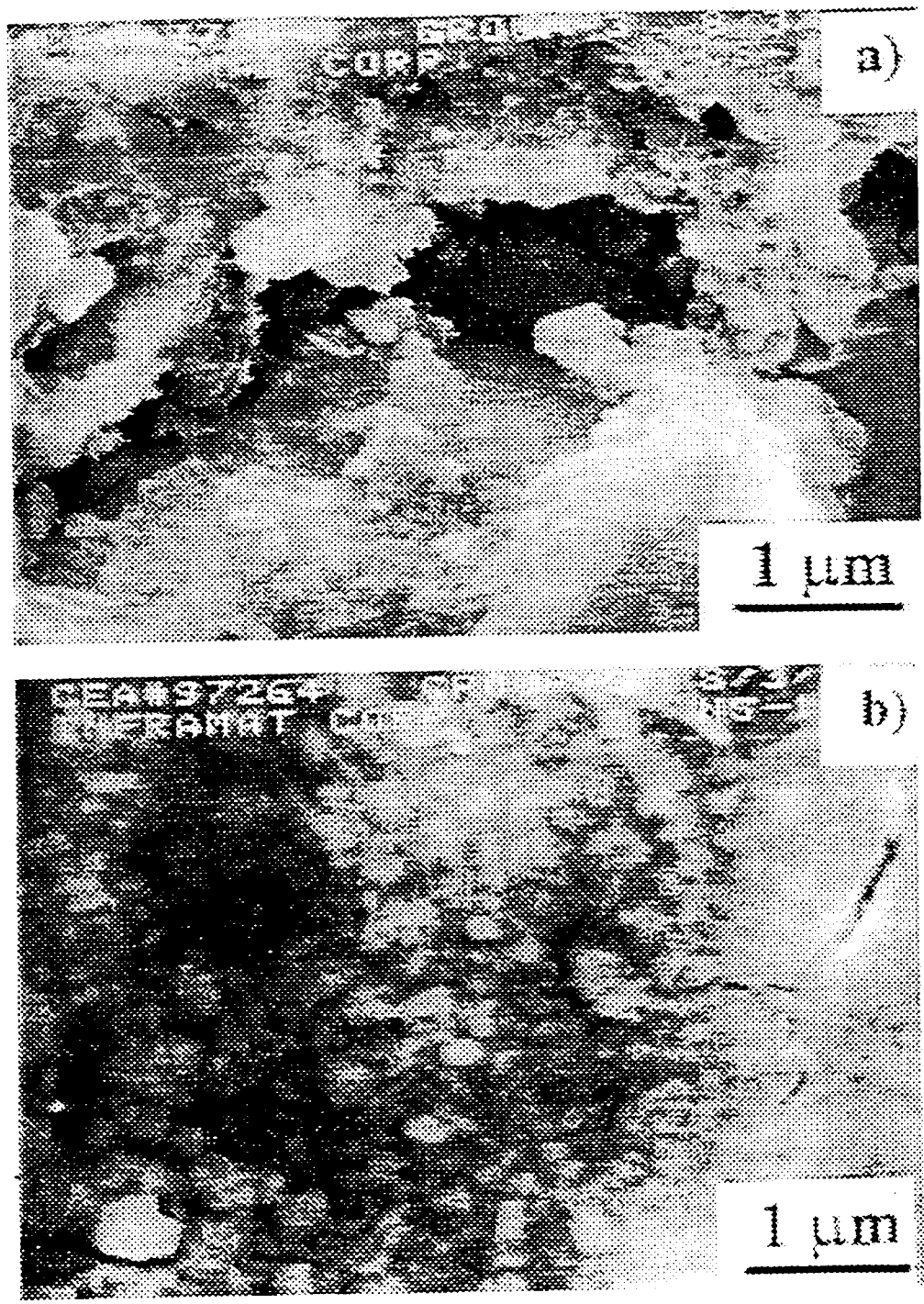
FIG. 7A is an SEM image depicting wear surfaces of conventional microsized alumina/titania coatings.
FIG. 7B is an SEM micrograph image depicting the wear surface of a nanostructured alumina/titania+ceria+7YSZ coating.

SEM studies of the wear surfaces revealed that there is a morphology difference between the coating sprayed with conventional alumina/titania powder and those with alumina/titania+ceria+7YSZ powders. The friction track on the Metco 130 coating is rough. Some grooves, plastic deformation and intergranular microfracture features can be found on the wear surface of the Metco 130 coating. In the nanostructured coatings, however, the wear surfaces are relatively smooth without obvious grooves, deformation and fewer microfracture features. It should be pointed out that cracks induced during wear are observed, as shown in FIGS. 7A and 7B, in both the wear surfaces of the Metco 130 and the alumina/titania+ceria+7YSZ coatings. Here, the dominating mechanism of material removal during wear of the Metco 130 coating is a combination of the grain dislodgment (due to grain boundary fracture) and lateral crack chipping, while the dominating mechanism material removal during wear of the nanostructured alumina/titania+ceria+7YSZ coating is the grain dislodgment.

The improved toughness of nanostructured alumina/titania coatings is probably the reason for its increased wear resistance. SEM examination showed that some cracks have already been produced in the Metco 130 coating before indentation and wear testing. These cracks are not only parallel to but also perpendicular to the coating surface.

Figure 8:
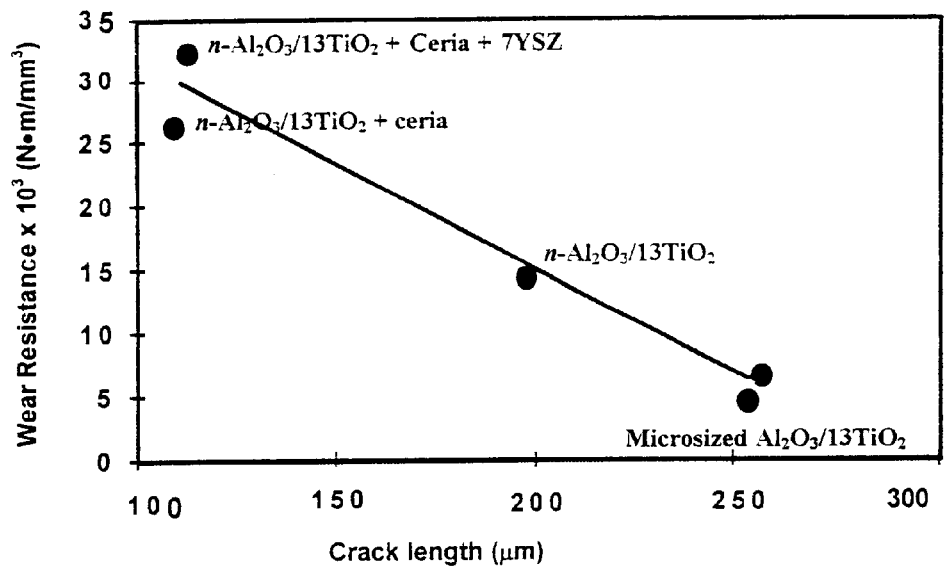
FIG. 8 is a line graph depicting the relationship between wear resistance and indentation cracking lengths.

FIG. 8 shows the relationship between the wear resistance and the indentation cracking lengths measured on the coating cross-sections. The indentation cracks could be found only at the direction parallel to coating surface during indentation of the alumina/titania coatings. The Metco 130 has the largest crack length, resulting in lowest wear resistance; while the crack length of the n-alumina/titania is relatively smaller than the Metco 130 coating, resulting in 100% increase in wear resistance. Additives of ceria and zirconia further reduce the cracking length significantly, resulting in greatly improved coating wear resistance.

Example 3

Addition of Ceria to Nanostructured Alumina/Titania

Reconstituted nanostructured alumina/titania+ceria powders having a composition of 87 wt % alumina and 13 wt % titania, and 6 wt % ceria were reprocessed to form a reconstituted powder as described below.

8.7 pounds of nanostructured alumina, grain size of about 30 nm, 1.3 lbs of titania, and 0.6 lbs of ceria, were blended and mixed, and then ball milled to obtain more homogeneous mixing and de-agglomeration of the powders. The ball milled mixture was dispersed in water to form a viscous slurry, and PVA added as a binder material. The slurry was then spray dried to form reconstituted alumina/titania+ceria spherical agglomerates. The reconstituted alumina/titania+ceria agglomerates mixture were then heat treated from room temperature to 1200° C. The reconstituted powders were then plasma sprayed to form a tenacious coating. The coating showed a greatly improved wear resistance and bond strength, similar to the coating properties obtained in Example 1.

Example 4

Addition of Ceria to Microstructured Alumina/Titania Composites 3.472 pounds of alumina (particle size 0.2 to 0.5 microns), 0.528 pounds of titania (particle size of 0.2 to 0.5 microns), and 0.24 lbs of ceria, were mixed, blended, and ball milled to obtain more homogeneous mixing and de-agglomeration of the powders. The ball milled alumina/titania+ceria mixtures were dispersed in water to form a viscous slurry, and PVA was added as a binder. The slurry is then spray dried to form reconstituted alumina/titania+ceria spherical agglomerates, which were then heat treated from room temperature to 1200° C.

Some of the reconstituted powders were also plasma reprocessed. The plasma reprocessed powders provided much greater tapping density, up to 2.0–2.4 g/cc, similar to the nanostructured counterparts. Both the heat treated and plasma treated powders were used as thermal spray feedstock to produce high quality coatings, having both high bond strength and improved wear resistance. The feedstock also provided better deposition efficiencies.

Example 5

Addition of YSZ to Microstructured Alumina/Titania Composites 3.073 kg of alumina (particle size 0.2 to 0.5 microns), 0.467 kg of titania (particle size of 0.2 to 0.5 microns), and 0.46 kg of 7YSZ were blended and mixed, then ball milled to obtain more homogeneous mixing and de-agglomeration of the powders. The ball milled mixture was dispersed in water to form a viscous slurry, and PVA added as a binder material. The slurry was then spray dried to form reconstituted alumina/titania+7YSZ composite spherical agglomerates. The reconstituted alumina/titania+7YSZ composite mixture was then heat treated from room temperature to 1200° C. Some of the reconstituted powders were also plasma reprocessed. Both the heat-treated and plasma treated powders were used as thermal spray feedstock to produce high quality coatings. The powder feedstock not only provided good mechanical properties, but it also provided better deposition efficiencies.

Example 6

Addition of Ceria and YSZ to Microstructured Alumina/Titania Composites 2.604 kg of alumina (particle size 0.2 to 0.5 microns), 0.396 kg of titania (particle size 0.2 to 0.5 microns), 0.18 kg of ceria, and 0.36 kg of 7YSZ were mixed and blended, and then ball milled to obtain more homogeneous mixing and de-agglomeration of the powders. The ball milled alumina/titania+ceria+7YSZ mixtures were dispersed in water to form a viscous slurry, and PVA was added as a binder. The slurry is then spray dried to form reconstituted alumina/titania+ceria+7YSZ spherical agglomerates, which were then heat treated from room temperature to 1200° C.

Some of the reconstituted powders were also plasma reprocessed. Both the heat-treated and plasma treated powders were used as thermal spray feedstock to produce high quality coatings. The powder feedstock not only provided good mechanical, but it also provided better deposition efficiencies.

Figure 9:
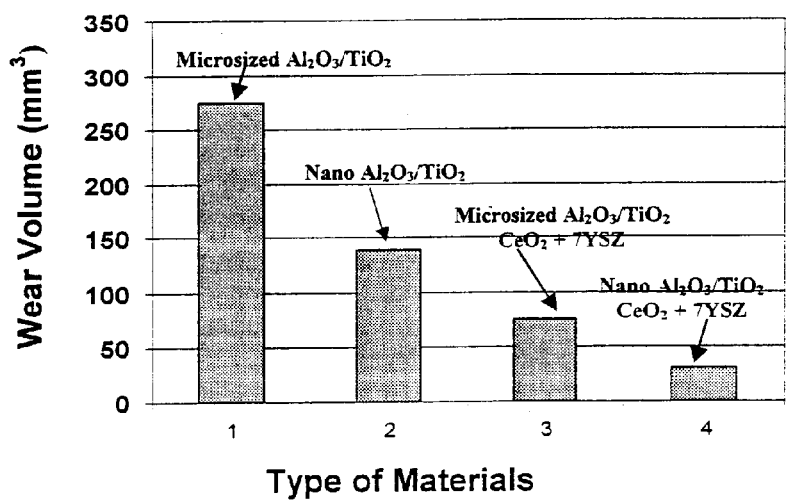
FIG. 9 is a bar graph comparing the abrasive results of various grades of alumina/titania coatings.

FIG. 9 shows the comparison abrasive results of various grades of alumina/titania coatings. The coatings deposited using Metco 130 commercial powders have the highest wear volume, i.e. the lowest wear resistance, whereas the wear resistances of the coatings deposited using alumina/titania+ceria+7YSZ feedstock powders and the nanostructured alumina/titania+ceria+7YSZ additives feedstocks are higher. By adding ceria and 7YSZ to the commercial micrometer sized alumina/titania composite, the wear resistance of this coating still can be increased approximately 4 times when compared to coatings deposited by using Metco 130 feedstock.

Example 7

Addition of Ceria to Microstructured Chromia/Titania Composites 0.5 kg of chromia, 0.061 kg of titania, and 0.036 kg of ceria were mixed and blended, then ball milled to obtain more homogeneous mixing and de-agglomeration of the powders. The ball milled mixture was then dispersed in water to form a viscous slurry, and PVA is added as a binder material. The slurry was spray dried to form reconstituted chromia/titania+ceria spherical agglomerates. The reconstituted chromia/titania+ceria agglomerates were then heat treated from room temperature to 1200° C. The powder after 1200° C. heat treatment has a tapping density of about 1.5 g/cc. This composite was then plasma sprayed to form a coating.

Example 8

Addition of Ceria and YSZ to Microstructured Chromia/Titania Composites 3.5 kg of chromia, 0.839 kg of titania, 0.194 kg of ceria, and 0.311 kg of 7YSZ are mixed and blended, and then ball milled to obtain more homogeneous mixing and de-agglomeration of the powders. The ball milled mixture was then dispersed in water to form a viscous slurry, and PVA was added as a binder material. The slurry was spray dried to form reconstituted chromia/titania+ceria+7YSZ spherical agglomerates, which were heat treated from room temperature to 1200° C., 1300° C., 1400° C., 1500° C., and 1600° C.

Properties of the reconstituted powder at various stages of the process are listed in Table 2. These include as reconstituted stage, after 1200° C., 1300° C., 1400° C., 1500° C., and 1600° C. heat treatment.

TABLE 2

Powder characteristic for the reconstituted chromia + 10titania + ceria + 7YSZ powders

| Powder process conditions | Density | | Hall Flow (g/min) |
|---|---|---|---|
| | Tapping (g/cc) | Theoretical (%) | |
| As spray dried | 1.499 | 29.4 | 38.4 |
| 1200° C. | 1.428 | 28 | No |
| 1300° C. | 1.52 | 29.8 | No |
| 1400° C. | 3.198 | 62.6 | Yes* |
| 1600° C. | 3.413 | 66.9 | Yes* |

*Powder can only flow through the Hall flow meter assisting with initial tapping by hand.

The reprocessed powders are plasma sprayed to form a coating using a Metco 9MB gun. The obtained coating has hardness of from 950 up to 1100 VHN, 67 Rockwell hardness, with coating porosity of less than 2% examined optically, and bond strength greater than 4,700 psi. Conventional chromia coatings have slightly lower hardness (microhardness of 900 VHN, Rockwell hardness of 65), slightly lower bond strength (4,000 to 4,500 psi).

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. All references cited herein are incorporated in their entirety.

What is claimed is:

1. A multi-component ceramic comprising:
   a major ceramic phase comprising a ceramic oxide composite;
   a ceramic oxide additive that is different from the major ceramic phase; and
   a rare earth ceramic oxide additive, wherein the total of the additives and comprise from about 0.1 weight percent to less than 50 weight percent based on the total weight the multi-component ceramic composite, and wherein all of the components are nanostructured.

2. The multi-component ceramic of claim 1, wherein one or both of the ceramic oxide additive and the rare earth ceramic oxide additive is a composite.

3. The multi-component ceramic of claim 1, wherein the major ceramic phase comprises oxides of aluminum, boron, calcium, magnesium, or a transition metal.

4. The multi-component ceramic of claim 1, wherein the major ceramic phase is alumina/titania or chromia/titania.

5. The multi-component ceramic of claim 1, wherein the ceramic oxide additive is an oxide of aluminum, boron, calcium, magnesium, or a transition metal.

6. The multi-component ceramic of claim 1, wherein the ceramic oxide additive comprises an oxide of chromium, iron, nickel, niobium, titanium, or zirconium.

7. The multi-component ceramic of claim 1, wherein the ceramic oxide additive comprises zirconium oxide, ceria-stabilized zirconium oxide, or yttria-stabilized zirconium oxide.

8. The multi-component ceramic of claim 1, wherein the rare earth ceramic oxide is an oxide of scandium, yttrium, lanthanum, cerium, praseodymium, neodymium, samarium, terbium, or ytterbium.

9. The multi-component ceramic of claim 1, wherein the rare earth ceramic oxide is an oxide of cerium or yttrium.

10. The multi-component ceramic of claim 1, comprising alumina, titania, ceria, and further comprising zirconia or yttria-stabilized zirconia.

11. The multi-component ceramic of claim 1, wherein the combination of additives comprises about 10 to about 40 wt % of the total weight of the composite.

12. The multi-component ceramic of claim 1, wherein the combination of additives comprises about 10 wt % to about 30 wt % of the total weight of the composite.

13. The multi-component ceramic comprising:
a major ceramic phase comprising a ceramic oxide composite;
a ceramic oxide additive that is different from the major ceramic phase; and
a rare earth ceramic oxide additive, wherein the total of the additives and comprise from about 0.1 weight percent to less than 50 weight percent based on the total weight the multi-component ceramic composite, wherein the multi-component ceramic comprises chromia, titania, ceria, and further comprises zirconia or yttria-stabilized zirconia.

14. The multi-component ceramic of claim 13, wherein at least one of the components is nanostructured.

15. A multi-component microstructured or nanostructured multi-component ceramic comprising
a major ceramic oxide phase comprising a ceramic oxide composite; and
one of a ceramic oxide additive or a rare earth ceramic oxide additive, wherein the amount of the additive comprises from about 0.1 weight percent to less than 50 weight percent based on the total weight the multi-component ceramic composite, wherein the multi-component ceramic comprises chromia, titania, and one of zirconia, ceria-stabilized zirconia, yttria-stabilized zirconia, ceria, or yttria.

16. The multi-component ceramic of claim 15, wherein the additive comprises about 1 to about 30 wt % of the total weight of the composite.

17. The multi-component ceramic of claim 15, wherein all of the components are nanostructured.

18. The multi-component ceramic of claim 15, wherein one or both of the ceramic oxide additive and the rare earth ceramic oxide additive is a composite.

19. The multi-component ceramic of claim 15, wherein the major ceramic phase further comprises oxides of aluminum, boron, calcium, magnesium, or a transition metal.

20. The multi-component ceramic of claim 15, wherein the multi-component ceramic comprises a rare earth ceramic oxide, and wherein the rare earth ceramic oxide is an oxide of cerium or yttrium.

21. The multi-component ceramic of claim 20, wherein the rare earth ceramic oxide further comprises an oxide of scandium, lanthanum, praseodymium, neodymium, samarium, terbium, or ytterbium.

22. The multi-component ceramic of claim 15, wherein the multi-component ceramic comprises a ceramic oxide additive, and wherein the ceramic oxide additive comprises zirconium oxide, ceria-stabilized zirconium oxide, or yttria-stabilized zirconium oxide.

23. The multi-component ceramic of claim 22, wherein the ceramic oxide additive further comprises an oxide of aluminum, boron, calcium, magnesium, or a transition metal.

24. The multi-component ceramic of claim 23, wherein the ceramic oxide additive comprises an oxide of chromium, iron, nickel, niobium, or titanium.

* * * * *